(12) United States Patent
Kojima et al.

(10) Patent No.: US 8,006,949 B2
(45) Date of Patent: Aug. 30, 2011

(54) SEAT SLIDE DEVICE FOR VEHICLE

(75) Inventors: Yasuhiro Kojima, Kariya (JP);
Masatoshi Hayakawa, Toyota (JP)

(73) Assignee: Aisin Seiki Kabushiki Kaisha,
Kariya-shi (JP)

( * ) Notice: Subject to any disclaimer, the term of this patent is extended or adjusted under 35 U.S.C. 154(b) by 208 days.

(21) Appl. No.: 12/307,365

(22) PCT Filed: Aug. 7, 2007

(86) PCT No.: PCT/JP2007/065407
§ 371 (c)(1),
(2), (4) Date: Jan. 5, 2009

(87) PCT Pub. No.: WO2008/018435
PCT Pub. Date: Feb. 14, 2008

(65) Prior Publication Data
US 2009/0314916 A1      Dec. 24, 2009

(30) Foreign Application Priority Data

Aug. 7, 2006   (JP) .................................. 2006-214838

(51) Int. Cl.
*F16M 13/00* (2006.01)
(52) U.S. Cl. ........ 248/429; 248/424; 248/430; 248/419; 296/65.13; 296/65.14; 296/65.15; 297/344.1; 297/344.11
(58) Field of Classification Search ................... 248/429, 248/430, 424, 419; 296/65.13, 65.14, 65.15; 297/344.1, 344.11
See application file for complete search history.

(56) References Cited

U.S. PATENT DOCUMENTS

| 6,328,272 | B1 * | 12/2001 | Hayakawa et al. | 248/429 |
| 6,354,553 | B1 * | 3/2002 | Lagerweij et al. | 248/430 |
| 6,378,928 | B1 * | 4/2002 | Downey | 296/65.13 |
| 6,572,066 | B1 * | 6/2003 | Paisley et al. | 248/429 |
| 6,637,712 | B1 * | 10/2003 | Lagerweij | 248/429 |
| 7,604,214 | B2 * | 10/2009 | Kojima et al. | 248/430 |
| 7,798,462 | B2 * | 9/2010 | Yoshida et al. | 248/429 |
| 2003/0042387 | A1 * | 3/2003 | Schuler et al. | 248/424 |

FOREIGN PATENT DOCUMENTS

| FR | 2 831 228 A1 | 4/2003 |
| JP | 2000 38063 | 2/2000 |
| JP | 2006 27329 | 2/2006 |

OTHER PUBLICATIONS

Office Action issued Aug. 12, 2010, in Chinese Patent Application No. 200780026553.2 (with English-language translation).
Office Action issued Oct. 7. 2010, in Europe Patent Application No. 07 792 076.7.

* cited by examiner

*Primary Examiner* — Nkeisha Smith
(74) *Attorney, Agent, or Firm* — Oblon, Spivak, McClelland, Maier & Neustadt, L.L.P.

(57) ABSTRACT

A seat slide device includes a handle rotatably supported in holding holes provided respectively at a pair of upper rails to rotate a radial projection portion for releasing a lock mechanism, and a bearing member having an outer edge portion disposed between the upper rail and the radial projection portion formed at the handle, a holding portion disposed between the upper rail and the outer periphery of the handle, and a cushioning portion allowing the handle to move in an axial direction. The bearing member is disposed to fit into the holding hole for supporting the handle.

15 Claims, 4 Drawing Sheets

SEAT SLIDE DEVICE FOR VEHICLE

TECHNICAL FIELD

The invention relates to a seat slide device for a vehicle including bearings holding a handle, which releases locks of each upper rail and each lower rail, at the upper rails.

BACKGROUND ART

A seat slide mechanism, which slides a seat in a forward and backward direction to suit a body frame of a person sitting on the seat, is provided at the seat on which an occupant of a vehicle is seated. For example, an invention disclosed in JP 2006-027329A is known as an invention of the seat slide mechanism. As shown in FIG. 2, the seat slide mechanism is configured by slidably fitting a pair of a first upper rail 12 and a second upper rail 12', fixed to a lower surface of the seat, into a pair of a first lower rail 11 and a second lower rail 11', fixed to a vehicle floor so as to extend in the forward and backward direction. A lock mechanism 20 is provided to lock sliding movement of the first upper rail 12 and the second upper rail 12' relative to the first lower rail 11 and the second lower rail 11', and a rod 51 is provided with an arm 81 projecting therearound. The arm 81 operates a release lever 18 releasing the lock of the lock mechanism 20. The rod 51 is rotatably supported by first and second holes 43 and 43' of first and second side frames 41 and 41', projecting respectively on the first and second upper rails 12 and 12', through a first and second felts 63 and 63'. The first felt 63 is provided being pressed between a first vertical wall 42 and an arm 61 (a first flange member) of the rod 51, and the second felt 63' is provided being pressed between a second vertical wall 42' and a washer 62 (a second flange member) of the rod 51. These first and second felts 63 and 63' prevent the rod 51 from moving in an axial direction, and further prevent noise, caused when the first flange portion 61 contacts with the first upper rail 12 and when the second flange portion 62 contacts with the second upper rail 12'.
Patent Document 1: JP2006-027329A

DISCLOSURE OF INVENTION

Objects to be Solved by the Invention

However, in the invention according to Patent Document 1, the felts 63 and 63', made of an elastic member, are disposed only between the first flange members 61 and 61' of the rod 51 and the vertical walls 42 and 42', where the holding holes 43 and 43', into which the rod 51 is inserted, are respectively opened. Thus, if a clearance exists in a rotation sliding portion where axial portions of the rod 51 and each holding hole 43 and 43' are in contact, the occurrence of the noise can not be prevented. Adversely, in order to prevent the noise, if a configuration that no clearance is provided in the rotation sliding portion is employed, assembly errors may be caused due to variations in positions of the holding holes 43 and 43'.

Further, an axial position of the rod 51 is determined by contact of the flange members 61 and 61' of the rod 51 with side walls (the vertical walls 42 and 42') on which the holding holes 43 and 43' are opened. Thus, when providing a clearance between each flange member 61 and 61' and each holding hole 43 and 43' to meet design requirements, rattling of the rod 51, caused along the axial direction, grows louder.

The present invention has been made in view of the above circumstances, and provides a seat slide device including bearings for a handle, which enables to assemble the handle for releasing a lock mechanism to the upper rails with greater ease, prevent the occurrence of the noise in handle operation, and absorb dimensional errors in manufacturing between the handle and the upper rails to assure proper operation.

Means to Solve an Object

According to a feature of the invention, a seat slide device for a vehicle includes a lower rail adapted to be mounted on a vehicle floor, an upper rail adapted to be mounted on a vehicle seat and supported movably relative to the lower rail, a lock mechanism having a lock portion disposed at one of the lower rail and the upper rail and a lock member disposed at the other one of the lower rail and the upper rail and being engageable with or disengageable from the lock portion, a holding hole provided at the other one of the lower rail and the upper rail, a handle rotatably supported in the holding hole of the other one of the lower rail and the upper rail, the handle rotated to operate the lock member, a radial projection portion formed at the handle, and a bearing member having an outer edge portion disposed between either one of the lower rail and the upper rail and the radial projection portion, a holding portion disposed between the other one of the lower rail and the upper rail and an outer peripheral portion of the handle, and a cushioning portion allowing the handle to move in an axial direction, wherein the bearing member is disposed to fit into the holding hole for supporting the handle.

According to a further feature of the invention, the bearing member is made of an elastic member.

According to a further feature of the invention, the bearing member has a fit holding portion comprised of the outer edge portion, the holding portion, and a projection holding an edge of the holding hole with the outer edge portion, and the fit holding portion is fitted into the holding hole and restrained against a lateral movement.

According to a further feature of the invention, the holding portion of the bearing member includes a bearing hole in which an end portion of the handle is rotatably supported, and the cushioning portion of the bearing member includes a projecting portion projecting inward from an inner surface of the bearing hole.

According to a further feature of the invention, the projection of the bearing member is formed at the holding portion and opposes to the outer edge portion, and the projection of the bearing member penetrates through the holding hole being shrunk due to elastic deformation and contacts with the edge of the holding hole to restrain the lateral movement of the bearing member when the bearing member is inserted into the holding hole.

According to a further feature of the invention, a pair of lower rails adapted to be mounted on a vehicle floor, a pair of upper rails adapted to be mounted on a vehicle seat and supported movably relative to the lower rail in a forward and backward direction on a plain surface of the rails, a lock mechanism having a plurality of lock portions formed at each lower rail and arranged in parallel to each other along a longitudinal direction of the lower rail and a lock member held on each upper rail, the lock member pivoted around a pivot axis extending in a longitudinal direction of the upper rail and being engageable with or disengageable from the plurality of lock portions, a pair of release levers, each moving the lock member to pivot and releasing engagement between the plurality of lock portions and the lock member, a handle being rotatable around a rotation axis extending in a lateral direction perpendicular to the longitudinal direction of the upper rail, the handle rotatably supported in the holding holes, which is provided at the pair of upper rails opposing to each other, the handle rotated to pivot the pair of release levers, and a pair of bearing members, each being formed with a bearing hole rotatably supporting an end portion of the handle, a thrust bearing portion restraining an axial movement of the end portion, a fit holding portion fitted into the holding hole and restrained against a lateral movement, and a lateral cushioning portion moving the thrust bearing portion in the lateral direction depending on variations in lateral distances between the end portions of the handle.

According to a further feature of the invention, a bearing member has a radial cushioning portion absorbing relative variations in positions of the opposing holding holes in a radial direction.

According to a further feature of the invention, the bearing member is made of an elastic body, and the lateral cushioning portion includes an engaged portion formed at each end portion of the handle and an engaging portion formed continuously from the fit holding portion to engage with the engaged portion and allowing the handle to move laterally relative to the bearing member in a range of elastic deformation.

According to a further feature of the invention, the bearing member is made of an elastic body, and the radial cushioning portion includes a radial clearance defined between the holding hole and an outer diameter of the bearing member fitted into the holding hole to be held.

According to a further feature of the invention, a rotation restraint engaged portion is formed at one of the holding hole and the bearing member, a rotation restraint engaging portion formed at the other one of the holding hole and the bearing member, the rotation restraint engaging portion engaging with the rotation restraint engaged portion to unrotatably fit the bearing member into the holding hole, a rotation restrained portion formed at one of the bearing member and the end portion of the handle, and a rotation restraining portion formed at the other of the bearing member and the end portion of the handle, the rotation restraining portion restraining the bearing member and the handle to maintain a relative rotation angle therebetween within a predetermined angle.

According to a further feature of the invention, the bearing member is made of an elastic member.

According to a further feature of the invention, a lower rail adapted to be mounted on a vehicle floor, an upper rail adapted to be mounted on a vehicle seat and supported movably relative to the lower rail, a lock mechanism having a lock portion disposed at one of the lower rail and the upper rail and a lock member disposed at the other one of the lower rail and the upper rail, the lock member being engageable with or disengageable from the lock portion, a holding hole provided at the other one of the lower rail and the upper rail, a handle rotatably supported in the holding hole in the other one of the lower rail and the upper rail, the handle rotated to operate the lock member, a radial projection portion formed at the handle, a bearing member having an outer edge portion disposed between the other one of the lower rail and the upper rail and the radial projection portion, a holding portion disposed between the other one of the lower rail and the upper rail and an outer peripheral portion of the handle, the holding portion including a bearing hole rotatably supporting an end portion of the handle, and a cushioning portion including a projecting portion projecting inward from an inner surface of the bearing hole, wherein the bearing member is disposed to fit in the holding hole and supports the handle.

Effect of the Invention

According to the invention, occurrence of noise, caused due to contact between the radial projection portion and one of the lower rail and the upper rail, can be prevented by the outer edge portion. Further, occurrence of noise, caused due to contact between the outer peripheral portion of the handle and the holding holes, can be prevented by the holding portion. Furthermore, the cushioning portion allows the handle to move in the axial direction relative to the holding hole, and each end portion of the handle is fitted into the holding hole to be held. Thus, the handle is easily assembled to one of the lower rail and the upper rail.

According to the invention, since the bearing member is made of the elastic body, the occurrence of the noise, caused due to the contact between the radial projection portion and one of the lower rail and the upper rail or caused due to contact between the outer peripheral portion of the handle and the holding hole, can be assuredly prevented. Further, when the handle is assembled into the holding hole, the bearing member is elastically deformed, thereby absorbing dimensional variations in manufacturing of the holding hole and the handle. Accordingly, greater ease of the assembly is provided.

According to the invention, the bearing member is restrained so as not to move laterally relative to the bearing hole by the outer edge portion and the projection of the fit holding portion. Thus, the rattling can be prevented between the bearing member and the holding hole. Further, the falling off of the bearing member from the holding hole can be prevented.

According to the invention, each end portion of the handle is rotatably supported by the bearing hole of the holding portion, and the lateral movement of the handle is restrained by holding each end portion of the handle by the projection portion provided at the cushioning portion. Meanwhile, the lateral movement of the handle is allowed within the range that is allowed by the cushioning portion. Thus, the handle is assembled with greater ease. Further, unnecessary movement of the handle is eliminated to prevent the occurrence of the rattling.

According to the invention, when the bearing member is inserted into the holding hole, the projection provided at the holding portion penetrates through the holding hole being shrunk due to the elastic deformation, and contacts with the edge of the holding hole to restrain the lateral movement of the bearing member. Thus, the bearing member can be assembled easily and quickly.

According to the invention, the axial movement of each end portion of the handle is restrained by the thrust axial portion. Thus, the handle can be assembled to each upper rail without causing the rattling. Further, even though dimensional variations in manufacturing exist between the lateral separation distance between the opposing holding holes and the lateral distance between the end portions of the handle, the lateral cushioning portion of the bearing member moves the thrust bearing portion in the lateral direction depending on the relative variations between the lateral separation distance and the lateral distance, and then each end portion of the handle is fitted into the holding hole to be held. Thus, the handle can be easily assembled to the upper rail.

According to the invention, the relative variations in the positions of the opposing holding hole is absorbed by the radial cushioning portion, and then each end portion of the handle is fitted into the holding hole to be held. Thus, the handle is assembled to the upper rail with greater ease.

According to the invention, when the lateral distance between the end portions of the handle forms a relatively longer length than a distance between mounting positions of the opposing upper rails (the lateral distance between the opposing holding holes), the lateral cushioning portion elastically deforms, thereby increasing a distance between the fit holding portion fitted into the holding hole and the engaged portion provided at the end portion of the handle. Thus, when assembling the handle to the upper rail, the bearing member holds the end portion of the handle in the holding hole in a position which is readjusted after the distance is increased. Adversely, when the lateral distance between the end portions of the handle forms a relatively shorter length than the distance between mounting positions of the opposing upper rails (the lateral distance between the opposing holding holes), the lateral cushioning portion elastically deforms, thereby decreasing the distance between the fit holding portion fitted into the holding hole and the engaged portion provided at the end portion of the handle. Thus, when assembling the handle to the upper rail, the bearing member holds the end portion of the handle in the holding hole in a position which is readjusted after the distance is shortened. As just described, the relative dimensional variations in manufacturing, existed between the lateral distance between the end portions of the handle and the lateral distance between the opposing holding holes, is absorbed by elastically deforming the lateral cushioning portion, and the handle can be easily assembled.

According to the invention, the relative variations in positions of the opposing holding holes is absorbed by the elastic deformation of the bearing member and the radial clearance defined between the holding hole and the outer diameter of the bearing member. Then, each end portion of the handle is fitted into the holding hole to be held. Thus, the handle is assembled to the upper rails with greater ease in the fairly simple configuration.

According to the invention, the bearing member is fitted into the holding hole so as not to rotate by the rotation restraint engaging portion and the rotation restraint engaged portion, and a relative rotation angle between the end portion of the handle and the bearing member is restrained by the rotation restrained portion and the rotation restraining portion. Thus, a rotational end of the handle (for example, non-operation position of the handle), which rotates relative to the holding hole, can be restrained.

According to the invention, since the bearing member is made of the elastic body, the restraint is loosened at the rotational end, where the handle rotates relative to the holding hole. Thus, breakage or damage of the handle, the holding hole, or the bearing member can be prevented.

According to the invention, the occurrence of the noise, caused by the contact between the radial projection portion and the one of the lower rail and the upper rail, can be prevented by the outer edge portion, and the occurrence of the noise, caused by the contact between the outer peripheral portion of the handle and the holding hole, can be prevented by the holding portion. While each end portion of the handle is rotatably supported by the bearing hole of the holding portion and the end portion of the handle is held by the projecting portion provided at the cushioning portion to restrain the lateral movement of the handle, the lateral movement of the handle is allowed in the range that is allowed by the cushioning portion. Thus, the handle is assembled with greater ease. Further unnecessary movement of the handle is eliminated and the rattling can be prevented.

BEST MODE FOR CARRYING OUT THE INVENTION

Figure 1:
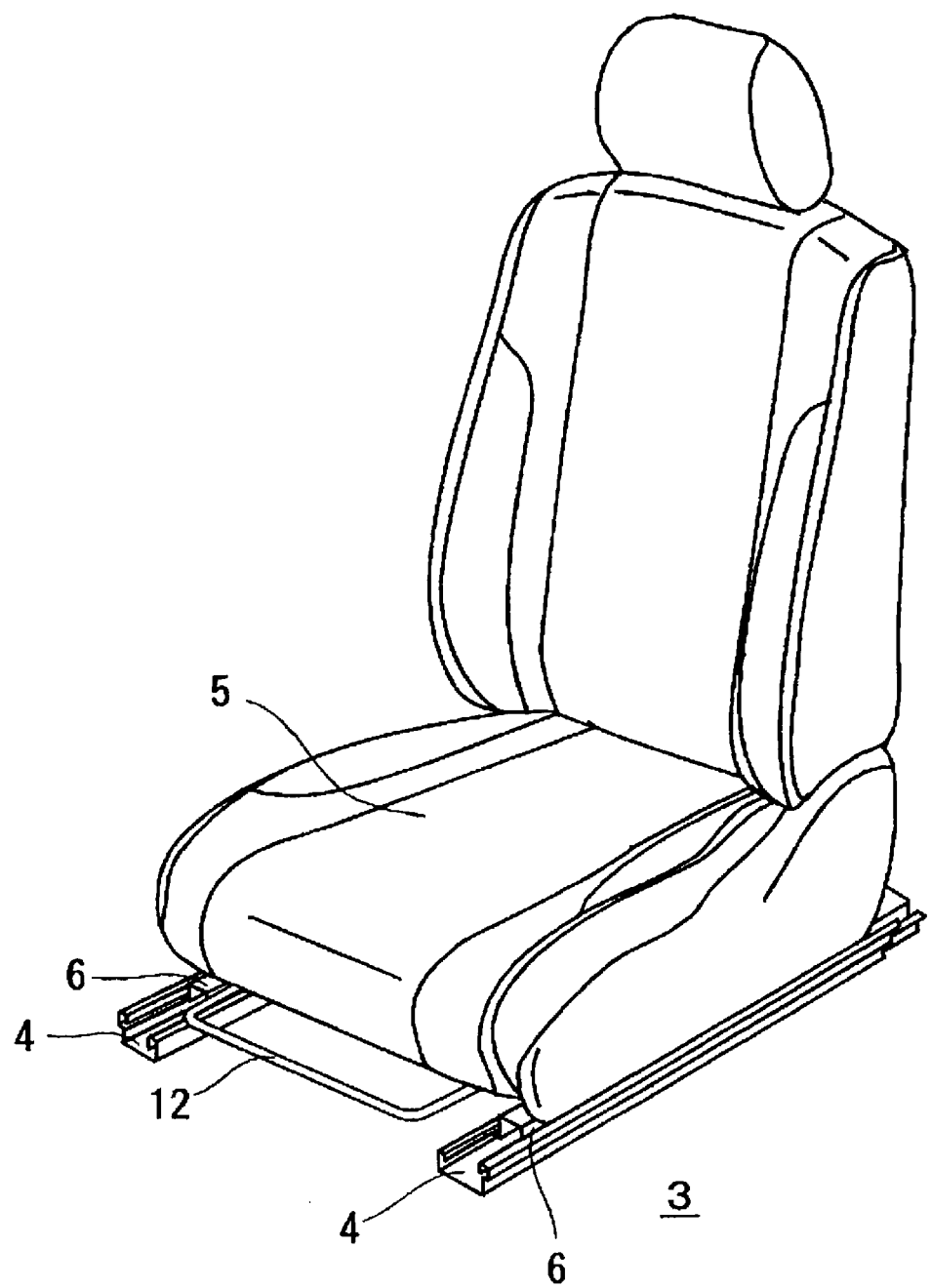
FIG. 1 is a schematic diagram showing a positional relationship of a seat slide device according to the invention within a vehicle seat.

An embodiment of a seat slide device for a vehicle according to the invention will be described with reference to drawings. FIG. 1 is a perspective view showing an overview of the seat slide device, and FIG. 2 is a schematic diagram showing an assembled state of a handle releasing a lock mechanism of the seat slide device to a rail track.

A seat slide device for a vehicle 2 includes lower rails 4, upper rails 6, lock mechanisms 8, release levers 10 releasing the lock mechanisms 8, and a handle 12 operating the release levers 10. As shown in FIG. 1, the lower rails 4 are fixed to a vehicle floor 3. The upper rails 6 are fixed to a vehicle seat 5 and are movably supported. The upper rails 6 move in a forward and backward direction relative to the lower rails 4 on a plane surface of the rails. As shown in FIG. 2, the lock mechanism 8 includes multiple lock holes 14, each serving as a lock portion, and a lock lever 18. The lock holes 14 are provided at the lower rail 4 and arranged in parallel to each other along a longitudinal direction of the lower rail 4, and the lock lever 18 pivots around a pivot axis 16 extending in a longitudinal direction of the upper rail 6 and serves as a lock member which is able to engage with or disengage from the lock holes 14. The lock lever 18 is assembled to the upper rail 6 by means of a bracket member (not shown) and is biased toward a direction that the lock lever 18 engages with the lock holes 14 by a spring member (not shown). The release lever 10 is formed so as to project in a direction perpendicular to a rotation axis of the handle 12 (rearward of the vehicle). The release lever 10 moves the lock lever 18 to pivot by pressing an interlock projecting portion 18a projecting on an upper portion of the lock lever 18 and releases the engagement between the lock holes 14 and the lock lever 18.

Figure 2:
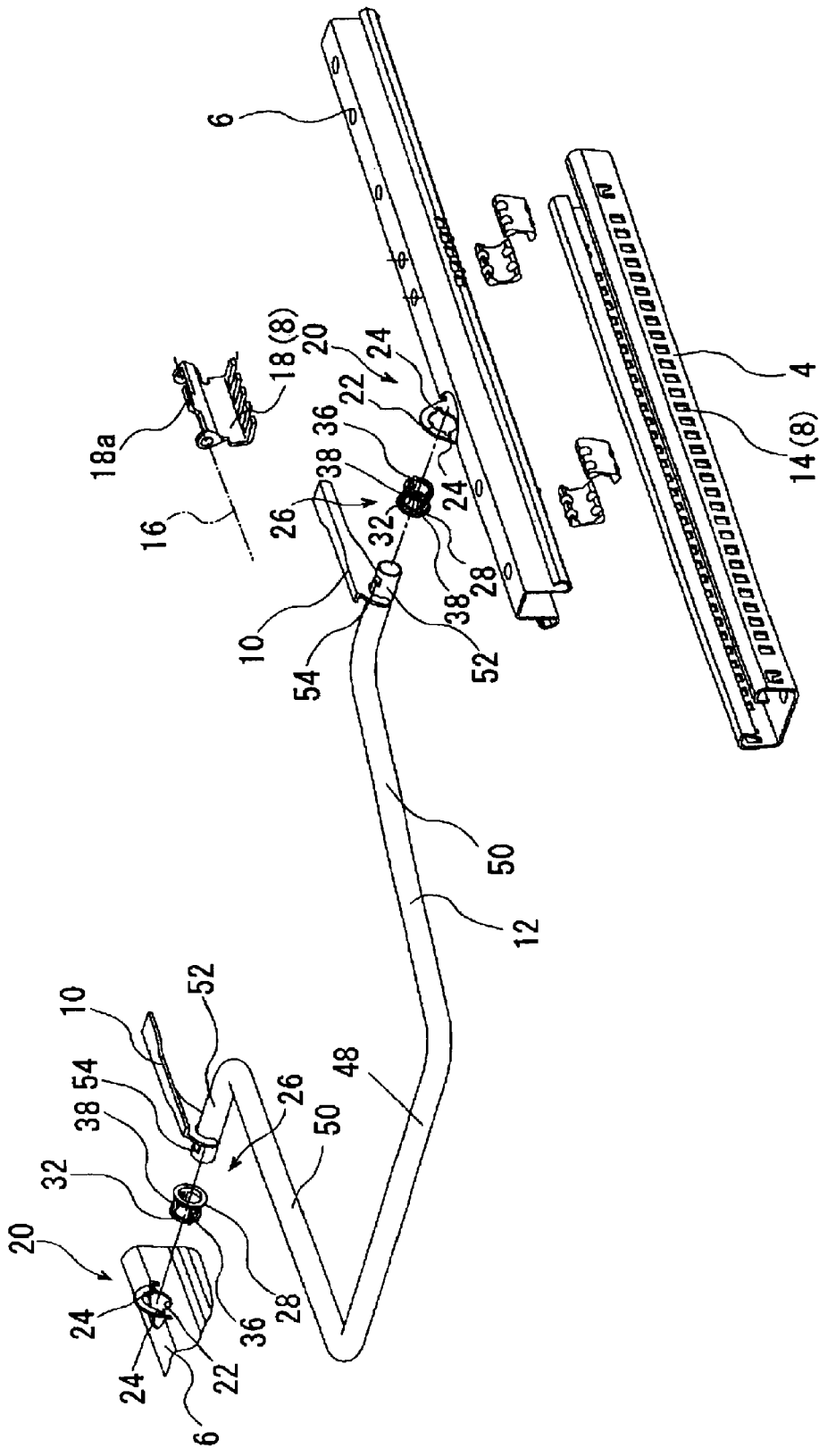
FIG. 2 is an exploded perspective view of the seat slide device.
Figure 3:
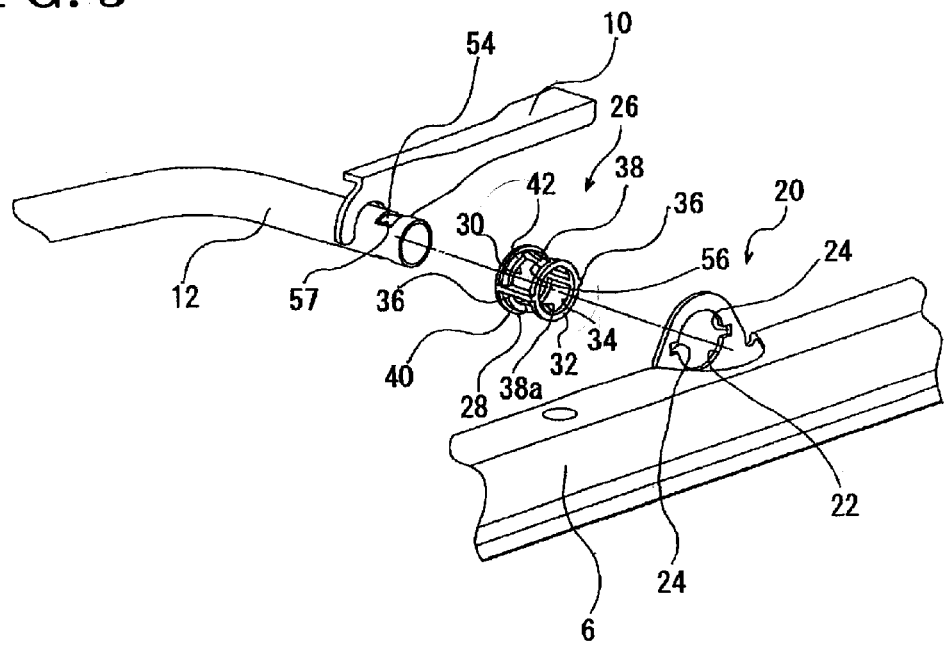
FIG. 3 is an enlarged view of the same.

As shown in FIG. 2, a bearing 20 is formed at each upper end of the opposing upper rails 6, which is close to a front portion thereof, and each end portion of the handle 12 is rotatably supported by the bearing 20. A holding hole 22 is formed in each bearing 20. As shown in FIG. 3, a pair of cutout engaging portions 24 is formed along a forward and backward direction on an inner periphery of each holding hole 22. Each cutout engaging portion 24 opens in a radial direction on the inner periphery of the holding hole 22 and serves as a rotation restraint engaged portion.

A handle bearing member 26 serving as a bearing member, which rotatably supports an end portion of the handle 12, is fitted into each holding hole 22. These handle bearing members 26 are made, for example, of an elastic plastic, and each handle bearing member 26 includes a substantially annular shaped fit holding portion 28, an inner side bearing hole 30, an outer side holding portion 32, and an outer side bearing hole 34. The fit holding portion 28 is fitted into the holding hole 22, and the inner side bearing hole 30 serves as a bearing hole, which is defined by an inner diameter of the fit holding portion and rotatably supports the end portion of the handle 12. The outer side holding portion 32 is formed in a substantially annular shape being spaced away from the fit holding portion 28, and an outer diameter thereof is formed so as to be smaller than an inner diameter of the holding hole 22. The outer side bearing hole 34 is defined by an inner diameter of the outer side holding portion 32 and rotatably supports the end portion of the handle 12. Further, the inner side bearing hole 30 forms a holding portion which is located between the holding hole 22 of the upper rail 6 and an outer periphery of the handle 12. A pair of engagement connecting portions 36, serving as a rotation restraint engaging portion, is formed between the fit holding portion 28 and the outer side holding portion 32. Each engagement connecting portion 36 is mounted along the forward and backward direction so as to be parallel to each other, and projects in the radial direction from an outer diameter of the fit holding portion 28 to engage with the cutout engaging portion 24 of the holding hole 22. Further, engaging portions 38 are formed between the fit holding portion 28 and the outer side holding portion 32. The engaging portions 38 are mounted so as to be parallel to each other in a vertical direction and engages with upper and lower engaged holes 54 of the handle 12, described below, from the vertical direction. The pair of upper and lower engaging portions 38 is formed in a pillar shape having a square cross section. Each engaging portion 38 is formed in a manner that curves to project toward a center direction. The portion of each engaging portion 38, projecting toward the center direction, forms a projecting portion 38a projecting inward from an inner surface of the bearing hole.

Additionally, the engaging portion 38 contacts with an axial outer side end edge of the engaged hole 54 and forms a thrust bearing portion which restrains axial movement of each end portion of the handle 12. The engaging portion 38 further forms a lateral cushioning portion which moves the thrust bearing portion in the lateral direction by being elastically deformed, depending on variations of a lateral distance between the end portions of the handle 12. Still further, the engaging portion 38 forms a cushioning portion which allows the axial movement of each end portion of the handle 12 and forms a cushioning portion which includes the projecting portion 38a projecting inward from the inner side of the inner side bearing hole 30.

Further, an outer edge portion 40, having an outer diameter which is slightly larger than the holding hole 22, is formed at the fit holding portion 28. The outer edge portion 40 contacts with an inner wall edge of the holding hole 22 and restrains the handle bearing member 26 so as not to move in a laterally outward direction. As just described, the outer edge portion 40 restrains the lateral movement of the handle bearing member 26 relative to the holding hole 22, thus preventing the handle bearing member 26 from rattling or falling off to the lateral outward side. A fit peripheral portion 42 is formed continuously from the outer edge portion 40 to extend outward, and an outer diameter of the fit peripheral portion 42 is formed so as to be smaller than the inner diameter of the holding hole 22. Thus, a radial clearance 44 is defined between the outer diameter of the fit peripheral portion 42 and the inner diameter of the holding hole 22. The clearance 44 forms a radial cushioning portion which absorbs relative variations in positions of the opposing holding holes 22 in the radial direction.

Furthermore, the projection portion 38a forms a holding pawl projecting in the radial direction relative to the holding portion formed by the inner side bearing hole 30. When the handle bearing member 26 is inserted into the holding hole 22, the holding pawl penetrates through the holding hole 22 being shrunk due to the elastic deformation. Then, the holding pawl contacts with an outer wall edge of the holding hole 22 to restrain the handle bearing member 26 so as not to move in the laterally inner direction. The peripheral portion of the holding hole 22 is held between the holding pawl and the outer edge portion 40, and the handle bearing member 26 is restrained so as not to move in the lateral direction relative to the holding hole 22. The fit holding portion 28 is formed by the outer edge portion 40, the inner side bearing hole (holding portion) 30, and the holding pawl (projection).

Although the handle 12 is not limited to the below-described form, the handle 12 is formed by bending a pipe and includes a grip portion 48, arm portions 50, and rotation axial portions 52 as shown in FIG. 2. The grip portion 48 extends in the lateral direction (a direction perpendicular to the longitudinal direction of the upper rail). The arm portions 50 are formed by bending both ends of the grip portion 48 at a right angle and extending in parallel to each other. The rotation axial portions 52 are formed by bending base portions of each arm portion 50 so as to extend in an opposite direction, and extends in the lateral direction. An engaged hole 54, having a predetermined width in circumferential and axial directions, is formed at upper and lower end portions of the rotation axial portion 52 to form a pair, and the projecting portion 38a of the engaging portion 38 is fitted into each engaged hole 54 to engage therewith. These projecting portions 38a hold the end portion of the handle 12, and the handle 12 is restrained so as not to move freely in the lateral direction by the thrust bearing portion, which contacts with the engaged hole 54. In addition, these engaging portions 38 allow the thrust bearing portion to move in the lateral direction in a range of the elastic deformation that is allowed by the cushioning portion which is supposed to be deformed or deflected. As a result, the handle 12 is able to move in the lateral direction (identical direction to an axial direction of the end portion of the handle). Thus, the handle can be assembled with greater ease and unnecessary movement of the handle 12 is eliminated to prevent the rattling.

Each engaged hole 54 serves as an engaged portion. Circumferential widths of the upper and lower engaging portions 38 are formed so as to be narrower than circumferential widths of the upper and lower engaged holes 54. A circumferential end portion of the engaging portion 38 contacts with one of both circumferential edge portions of the engaged hole 54, and the engaging portion 38 and the engaged hole 54 form a rotation restraining portion 56 and a rotation restrained portion 57, which contact with each other to restrain the handle bearing member 26 and the handle 12 so as not to rotate exceeding a predetermined angle therebetween. In the embodiment, when the grip portion 48 of the handle 12 is at the lowest position thereof, a rear edge portion of the upper engaged hole 54 of the handle 12 contacts with a rear end portion of the upper engaging portion 38, and a front edge portion of the lower engaged hole 54 contacts with a front end portion of the lower engaging portion 38. Thus, the handle 12 is restrained at a non-operation position. Meanwhile, when the grip portion 48 of the handle 12 is at the highest position thereof, a front edge portion of the upper engaged hole 54 of the handle contacts with a front end portion of the upper engaging portion 38, and a rear edge portion of the lower engaged hole 54 contacts with a rear end portion of the lower engaging portion 38. Consequently, the handle 12 is restrained at an operation position. In the operation position, the release lever 10 contacts with the interlock projecting portion 18a of the lock lever 18 and moves the lock lever 18 to pivot. Then, the engagement of the lock lever 18 and the lock holes 14 is released.

In such a case, since each engaging portion 38 of the handle bearing member 26 is made of an elastic body, an impact, caused due to contact with the engaged hole 54, is weaken to prevent the handle bearing member 26 from breaking or be damaged.

When assembling the seat slide device for the vehicle 2, configured as described above, to the vehicle floor 3, one of the lower rails 4, into which the upper rail 6 is incorporated, is fixed at a mounting position by bolts, nuts and the like. The mounting position is set so that the rails extend in the forward and backward direction of the vehicle. Then, the handle bearing member 26 is fitted into the holding hole 22 of the upper rail 6 in a manner that the handle bearing member 26 is unable to rotate relative to the holding hole 22 and to move in the lateral direction. Next, one end portion of the handle 12 is inserted into the bearing holes 30 and 34 of the handle bearing member 26. Then, the engaging portion 38 of the handle bearing member 26 is engaged with the engaged hole 54 of one of the end portions of the handle 12.

Figure 4:
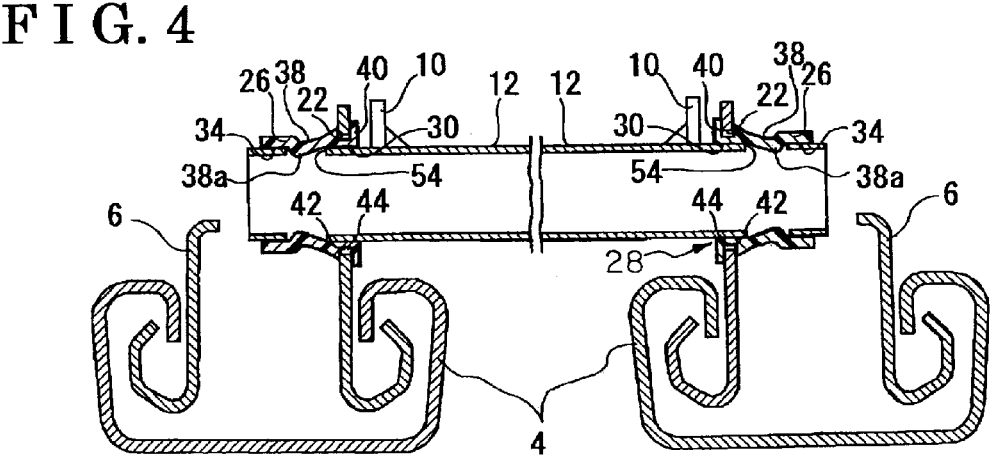
FIG. 4 is a sectional view showing an assembled state of a bearing member of the same.

Similarly, the other lower rail 4, into which the upper rail 6 is incorporated, is disposed in parallel with the one of the lower rails 4, which has been fixed. Similarly to the preceding description, the handle bearing member 26 is fitted into the holding hole 22 of the other upper rail 6. As shown in FIG. 4, the other end portion of the handle 12 is inserted into the bearing hole 22 of the handle bearing member 26. Then, the engaging portion 38 of the handle bearing member 26 is engaged with the engaged hole 54 of the other end portion of the handle 12.

Figure 5:
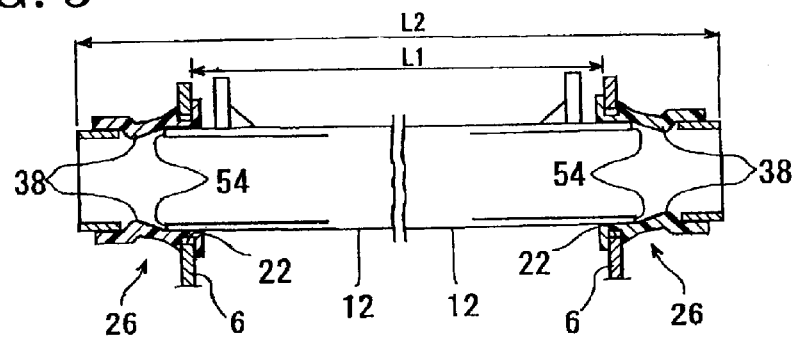
FIG. 5 is a diagram showing an operating state of the same.
Figure 6:
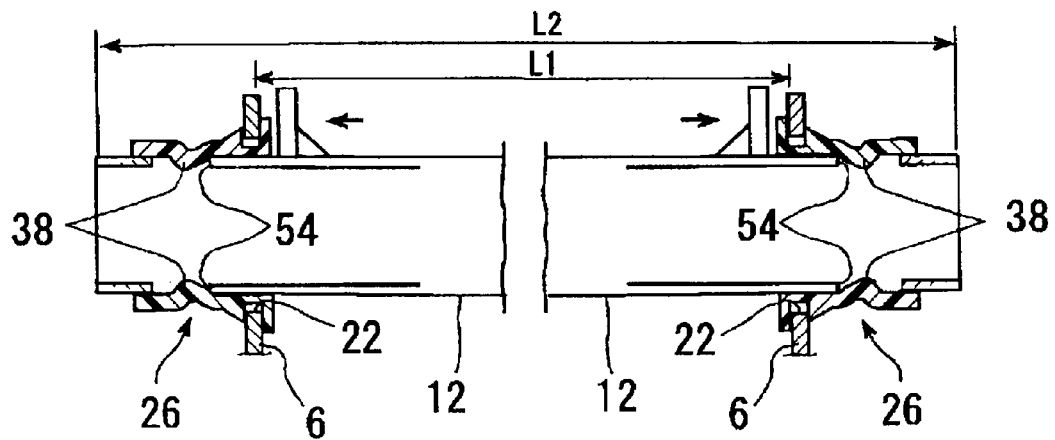
FIG. 6 is a diagram showing the operating state of the same.
Figure 7:
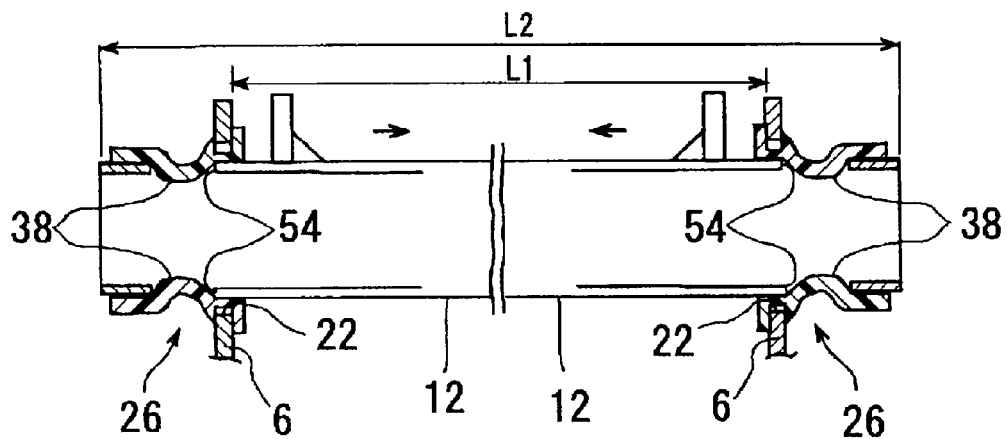
FIG. 7 is a diagram showing the operating state of the same.

At this point, if a lateral separation distance L1 between the opposing holding holes 22 and a lateral distance L2 between both end portions of the handle are formed in accordance with design dimensions, as shown in FIG. 5, a lateral external force, deforming the handle bearing members 26, does not occur at the handle bearing members 26, and the end portions of the handle 12 are respectively fitted into the opposing holding holes 22 to be held. Further, a force, exerted in an axial direction of each end portion of the handle 12, is not applied to the thrust bearing portion. However, for example, when the lateral distance L2 between the end portions of the handle 12 forms a relatively longer length than the design dimension set in accordance with the lateral separation distance L1 between the opposing holding holes 22, as shown in FIG. 6, each curved engaging portion 38 of the handle bearing members 26 is bent due to the elastic deformation in a manner that the curve becomes shallower, and each lateral inner end edge of the engaged hole 54 is displaced outward relative to the engaging portion 38. The displacement increases a distance between the fit holding portion 28 fitted into the holding hole 22 and the engaged hole 54 provided at the end portion of the handle 12, and thus both the end portions of the handle 12 are securely held at the holding hole 22 in a position which is readjusted after the distance is increased. Adversely, for example, when the lateral distance L2 between the end portions of the handle 12 forms a relatively shorter length than the design dimension set in accordance with the lateral separation distance L1 between the opposing holding holes 22, as shown in FIG. 7, the thrust bearing portion is displaced inward in the axial direction, depending on an amount that the lateral distance between the end portions of the handle 12 relatively shortened and receives an axial force from the outer end edge of the engaged hole 54 of the handle 12. Consequently, each engaging portion 38 is significantly bent due to the elastic deformation and the end portions of the handle 12 are securely held under the condition where the engaging portion is significantly bent. Thus, the rattling, which occurs when the lateral distance L2 between the end portions of the handle 12 forms a relatively shorter length than the design dimension set in accordance with the lateral separation distance L1 between the opposing holding holes 22, can be prevented.

As described above, the lateral cushioning portion (the engaging portion and the like) 38 absorbs relative variations in manufacturing of the lateral separation distance L1 between the opposing holding holes 22 and the lateral distance L2 between the end portions of the handle 12. Thus, in addition to preventing the rattling, the handle 12 can be easily assembled to a desired position where the handle 12 is appropriately operated relative to the holding holes 22.

Figure 8:
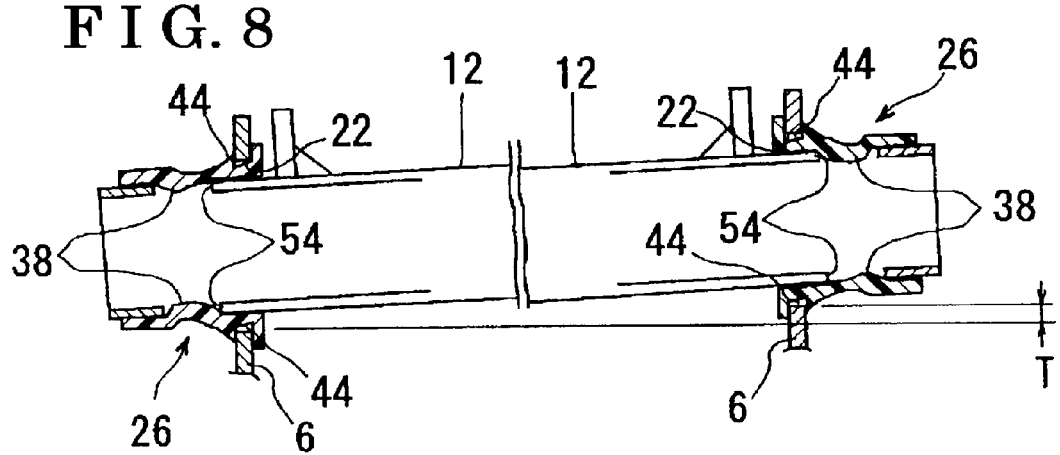
FIG. 8 is a diagram showing the operating state of the same.

Further, for example, as shown in FIG. 8, when the positions are not radially aligned relative to each other between the opposing holding holes 22, the relative variations in the positions of the opposing holding holes 22 are absorbed by utilizing the elastic deformation of each handle bearing member 26 and each radial clearance 44 defined between the holding hole 22 and the outer diameter of the handle bearing member 26. Thus, the handle 12 is assembled to the upper rails 6 (the opposing holding holes 22) with greater ease in such a fairly simple configuration.

In the seat slide device for the vehicle 2 assembled as described above, in a state that the grip portion 48 of the handle 12 is not operated (a lock state), a distal end portion of the release lever 10 is raised and apart from the interlock projecting portion 18a of the lock lever 18. Thus, the engagement between the lock lever 18 and the lock holes 14 is maintained. In this case, the handle 12 is restrained in the non-operation position by the rotation restraining portion 56 and the rotation restrained portion 57 so that the grip portion 48 is not further lowered.

When the grip portion 48 of the handle 12 is raised, the distal end portion of the release lever 10 lowers. Then, the distal end portion of the release lever 10 contacts and pushes down the interlock projecting portion 18a. Consequently, the lock lever 18 is pivoted to release the engagement of the lock lever 18 with the lock holes 14, and the upper rail 6 becomes movable (a released state). In this case, the handle 12 is restrained in the operation position by the rotation restraining portion 56 and the pivot restrained portion 57 so that the grip portion 48 is not further raised. In the operation of the handle 12 as described above, since the outer edge portion 40 of the handle bearing member 26 is provided between the release lever 10 (the radial projection portion) and the upper rail 6, the occurrence of the noise, caused due to the contact between the release lever 10 and the upper rail 6, can be prevented. Further, the occurrence of the noise, caused due to the contact between the outer peripheral portion of the handle 12 and the holding hole 22 of the upper rail 6, can be prevented with the holding portion of the handle bearing member 26, formed by the inner side bearing hole 30.

Meanwhile, in the embodiment, an elastic plastic is used for the handle bearing member. However, the material of the handle bearing member is not limited to this material. Known elastic materials such as nonwoven fabric or rubber may be used.

Further, the handle bearing members are respectively assembled to the upper rails. However, the configuration is not limited to this form. For example, the handle bearing members may be respectively assembled to the lower rails if a different configuration of a lock mechanism is adopted.

Furthermore, the rotation restraining portion 56 is formed at the end portion of the engaging portion 38 of the handle bearing member, and the rotation restrained portion 57 is formed at the circumferential end portion of the engaged hole 54 of the handle, engaging with the rotation restraining portion 56. However, the rotation restraining portion 56 and the rotation restrained portion 57 are not limited to this form. For example, when a portion corresponding to the engaged hole is provided at the handle bearing member and a portion corresponding to the engaging portion is provided at the handle, the engaging portion provided at the handle may serve as the rotation restrained portion and the engaged hole provided at the handle bearing member may serve as the rotation restraining portion.

Still further, the handle bearing members are used to support both the end portions of the handle. However, the configuration is not limited to this form. For example, the handle bearing member may be used for supporting only one end portion of the handle. This allows the axial position of the handle to be flexibly restrained relative to the upper rail (the lower rail), resulting in smooth rotation of the handle.

Still further, the holding pawls, forming a pair and each serving as a projection opposing to the outer edge portion 40, are respectively formed at the inner side of the engaging portions 38 so as to project in the radial direction from the holding portions. However, the holding pawl is not limited to this form. For example, each holding pawl may be formed in an annular projection which is annularly formed opposing to the outer edge portion 40. Forming the holding pawl in the annular projection increases a force for holding the handle bearing member in the holding hole.

Still further, in the above-mentioned embodiment, the thrust bearing portion of the handle bearing member is formed in a portion that contacts with the outer end edge of the engaged hole of the handle. However, the thrust bearing portion is not limited to this form. For example, the thrust bearing portion may be formed in a portion that contacts with the inner end edge of the engaged hole by shaping the portion so as to incline sharply toward the axial direction of the end portion of the handle.

INDUSTRIAL APPLICABILITY

The seat slide device for the vehicle according to the invention is useful for a seat for a vehicle in which a slide mechanism is operated by a handle under the seat. In particular, the seat slide device is suitable when simple operation for assembling the seat to the floor and an anti-rattle feature are required.

The invention claimed is:

1. A seat slide device for a vehicle comprising:
a lower rail adapted to be mounted on a vehicle floor;
an upper rail adapted to be mounted on a vehicle seat and supported movably relative to the lower rail;
a lock mechanism having:
a lock portion disposed at one of the lower rail and the upper rail; and
a lock member disposed at an other one of the lower rail and the upper rail, the lock member being engageable with or disengageable from the lock portion;
a holding hole provided at the other one of the lower rail and the upper rail;
a handle rotatably supported in the holding hole, the handle rotated to operate the lock member;
a radial projection portion formed at the handle; and
a bearing member fitting in the holding hole and supporting the handle, the bearing member having:
an engaging portion which engages the handle to restrain axial movement of the handle relative to the bearing member;
a holding portion holding the other one of the lower rail and the upper rail, the holding portion disposed between an outer peripheral portion of the handle and the other one of the lower rail and the upper rail, the holding portion including an outer edge portion disposed between the other one of the lower rail and the upper rail and the radial projection portion; and
a cushioning portion allowing the handle, whose axial movement is restrained by the engaging portion, to move in an axial direction relative to the other one of the lower rail and the upper rail.

2. A seat slide device for a vehicle according to claim 1, wherein the bearing member is made of an elastic member.

3. A seat slide device for a vehicle according to claim 1, wherein the bearing member has a fit holding portion comprised of the outer edge portion, the holding portion, and a projection holding an edge of the holding hole with the outer edge portion, and the fit holding portion is fitted into the holding hole and restrained against a lateral movement.

4. A seat slide device for a vehicle according to claim 1, wherein the holding portion of the bearing member includes a bearing hole in which an end portion of the handle is rotatably supported, and the cushioning portion of the bearing member includes a projecting portion projecting inward from an inner surface of the bearing hole.

5. A seat slide device for a vehicle according to claim 3, wherein the projection of the bearing member is formed at the holding portion and opposes to the outer edge portion, and wherein the projection of the bearing member penetrates through the holding hole being shrunk due to elastic deformation and contacts with the edge of the holding hole to restrain the lateral movement of the bearing member when the bearing member is inserted into the holding hole.

6. A seat slide device for a vehicle comprising:
a pair of lower rails adapted to be mounted on a vehicle floor;
a pair of upper rails adapted to be mounted on a vehicle seat and supported movably relative to the lower rail in a forward and backward direction on a plain surface of the rails;
a lock mechanism having:
a plurality of lock portions formed at each lower rail and arranged in parallel to each other along a longitudinal direction of the lower rail; and
a lock member held on each upper rail, the lock member pivoted around a pivot axis extending in a longitudinal direction of the upper rail and being engageable with or disengageable from the plurality of lock portions,
a pair of release levers, each moving the lock member to pivot and releasing engagement between the plurality of lock portions and the lock member;
a handle being rotatable around a rotation axis extending in a lateral direction perpendicular to the longitudinal direction of the upper rail, the handle rotatably supported in holding holes provided at the pair of upper rails opposing to each other, the handle rotated to pivot the pair of release levers; and
a pair of bearing members, each being formed with:
a bearing hole rotatably supporting an end portion of the handle;
a thrust bearing portion restraining an axial movement of the end portion;
a fit holding portion fitted into a holding hole and restrained against a lateral movement; and
a lateral cushioning portion permitting the thrust bearing portion to move in the lateral direction depending on variations in lateral distances between the end portions of the handle.

7. A seat slide device for a vehicle according to claim 6, wherein each bearing member has a radial cushioning portion absorbing relative variations in positions of the opposing holding holes in a radial direction.

8. A seat slide device for a vehicle according to claim 6, wherein each bearing member is made of an elastic body, and the lateral cushioning portion includes an engaged portion formed at each end portion of the handle and an engaging portion formed continuously from the fit holding portion to engage with the engaged portion and allowing the handle to move laterally relative to the bearing member in a range of elastic deformation.

9. A seat slide device for a vehicle according to claim 7, wherein each bearing member is made of an elastic body, and the radial cushioning portion includes a radial clearance defined between the holding hole and an outer diameter of the bearing member fitted into the holding hole to be held.

10. A seat slide device for a vehicle according to claim 6, further comprising:
  a rotation restraint engaged portion formed at one of the holding hole and one of the bearing members;
  a rotation restraint engaging portion formed at the other one of the holding hole and the one of the bearing members, the rotation restraint engaging portion engaging with the rotation restraint engaged portion to unrotatably fit the one of the bearing members into the holding hole;
  a rotation restrained portion formed at either one of the one of the bearing members or the end portion of the handle; and
  a rotation restraining portion formed at an other one of the one of the bearing members and the end portion of the handle, the rotation restraining portion restraining the one of the bearing members and the handle to maintain a relative rotation angle therebetween within a predetermined angle.

11. A seat slide device for a vehicle according to claim 10, wherein the bearing member is made of an elastic member.

12. A seat slide device for a vehicle comprising:
  a lower rail adapted to be mounted on a vehicle floor;
  an upper rail adapted to be mounted on a vehicle seat and supported movably relative to the lower rail;
  a lock mechanism having:
    a lock portion disposed at one of the lower rail and the upper rail; and
    a lock member disposed at an other one of the lower rail and the upper rail, the lock member being engageable with or disengageable from the lock portion;
  a holding hole provided at the other one of the lower rail and the upper rail;
  a handle rotatably supported in the holding hole, the handle rotated to operate the lock member;
  a radial projection portion formed at the handle; and
  a bearing member fitting in the holding hole and supporting the handle, the bearing member having:
    a holding portion disposed between the other one of the lower rail and the upper rail and an outer peripheral portion of the handle, the holding portion including a bearing hole rotatably supporting an end portion of the handle, the holding portion including an outer edge portion disposed between the other one of the lower rail and the upper rail and the radial projection portion; and
  a cushioning portion including a projecting portion projecting inward from an inner surface of the bearing hole.

13. A seat slide device for a vehicle according to claim 12, wherein the bearing member has an engaging portion which engages the handle to restrain axial movement of the handle relative to the bearing member.

14. A seat slide device for a vehicle according to claim 12, wherein the cushioning portion is formed in a pillar shape having a square cross section.

15. A seat slide device for a vehicle according to claim 14, wherein the cushioning portion comprises plural cushioning portions.

* * * * *